(12) United States Patent
Hsieh

(10) Patent No.: US 8,004,750 B1
(45) Date of Patent: Aug. 23, 2011

(54) MULTIPLE-FSR DPSK DEMODULATOR

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 111 days.

(21) Appl. No.: 12/541,894

(22) Filed: Aug. 14, 2009

Related U.S. Application Data

(60) Provisional application No. 61/094,966, filed on Sep. 7, 2008.

(51) Int. Cl.
*G02F 2/00* (2006.01)

(52) U.S. Cl. ........ 359/325; 359/578; 359/629; 359/633; 356/477; 398/201

(58) Field of Classification Search .................. 359/279, 359/325, 578, 627–634; 356/477; 398/141, 398/158, 159, 183, 188, 201, 208; 385/140
See application file for complete search history.

(56) References Cited

U.S. PATENT DOCUMENTS

| | | | | |
|---|---|---|---|---|
| 3,517,982 A * | 6/1970 | Fonda-Bonardi Giusto | . 359/279 |
| 4,773,732 A * | 9/1988 | Schafer | 359/578 |
| 7,522,343 B2 * | 4/2009 | Hsieh | 359/634 |
| 7,526,210 B2 * | 4/2009 | Liu | 398/188 |
| 7,668,466 B2 * | 2/2010 | Tian et al. | 398/202 |
| 7,706,069 B2 * | 4/2010 | Mehl et al. | 359/484.08 |
| 7,738,115 B2 * | 6/2010 | Ocelic et al. | 356/501 |

* cited by examiner

*Primary Examiner* — Daniel Petkovsek
(74) *Attorney, Agent, or Firm* — Antonio R. Durando

(57) ABSTRACT

A switchable free-spectral-range mode selector is used to change the free spectral range of a free-space delay-line interferometer. The mode selector consists of a rotatable device with at least one transparent plate selected to produce the desired change in the free spectral range of the delay-line interferometer. The device may be rotated in and out of the free-space optical path of on of the interferometer arms. If used as a DPSK demodulator, the device enables operation at multiple predetermined free spectral ranges. In the preferred embodiment, the demodulator includes a 50/50 beam-splitter cube combined with two cavities. The mode selector consists of a plurality of different transparent slabs attached to a rotatable shaft so that any one of the slabs or none may be inserted in the appropriate optical path to obtain the desired FSR mode of operation.

5 Claims, 5 Drawing Sheets

MULTIPLE-FSR DPSK DEMODULATOR

RELATED APPLICATIONS

This application is based on and claims the priority of U.S. Provisional Application Ser. No. 61/094,966, filed Sep. 7, 2008.

BACKGROUND OF THE INVENTION

1. Field of the Invention

This invention relates to differential phase-shift keying (DPSK) in telecommunication. More specifically, it relates to DPSK devices for multiple free-spectral-range operation.

2. Description of the Prior Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases is used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal (such a system is termed coherent).

Alternatively, instead of using bit patterns to set the phase of the wave, the patterns are used to set changes in the phase of the signal. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK because there is no need for the demodulator to have a copy of the reference signal to determine the exact phase of the received signal (i.e., it is a non-coherent scheme).

In telecommunication technology, differential phase-shift keying utilizes a decoding method in order to convert the phase-keyed signal to an intensity-keyed signal at the receiving end. The decoding method can be achieved by comparing the phase of two sequential bits. In principle, it splits the input signal beam into two channels with a small delay before recombining them. After the recombination, the beams from the two channels interfere constructively and destructively. The interference intensity is measured and becomes the intensity-keyed signal. To achieve this, one channel has an optical path longer than the other by a distance equivalent to the photon flight time of one bit. For instance, in a 40 Gbit-per-second system, one bit is equal to 25 ps and light travels 7.5 mm in that period. Thus, in this example, the optical path difference (OPD) between the two channels would be set at 7.5 mm.

The Mach-Zehnder type interferometer with a desired OPD between the two channels has been used for decoding purposes. Because of the properties of optical interference, a change in OPD can greatly affect interference intensity. Moreover, the optical path in each arm is much longer than its difference. Therefore, a sophisticated temperature control is required to maintain the optical path in each arm in order to assure that the change in the OPD is much less than a small fraction of one wavelength, e.g., about 10 nm. This is difficult and expensive to achieve, especially for an interferometer with a long optical path.

FIG. 1 shows the typical configuration of a Michelson interferometer 10. The core of such device consists of a beam-splitter cube 12 and two mirrors 14,16 positioned so as to reflect the transmission and reflection beams produced by the beam splitter. Two cavity structures are shown in the figures because commonly used in the art, but it is understood that the mirrors 14,16 are the only relevant optical elements to the Michelson configuration and the rest of the structure can take different forms. The input signal I impinges on the beam-splitting surface 18 of the beam-splitter cube 12 and produces two beams (a reflected beam R and a transmitted beam T), each carrying 50% of the total power. After both beams R,T are reflected by the mirrors 14,16 along their respective optical paths, they return to the beam-splitting surface 18 and are split again, thereby producing two pairs of beams propagating in different directions. The two beams in each pair interfere, both constructively and destructively, to produce two output beams O1 and O2 that are 180 degrees out of phase.

As mentioned, the mirrors 14,16 are illustrated as components of cavity structures formed by combining two pieces of fused silica glass plates (20,22 and 24,26) and a number of spacers (28 and 30) interposed between them. Therefore, the cavity length is defined by the length of the spacers in the cavity. (Two spacers are illustrated for each cavity, but different numbers are often used in the art to meet other design requirements.) The spacers are typically made of a Zerodur® or a ULE® (ultra low expansion) glass, both substances with a coefficient of thermal expansion (CTE) less than 0.05 ppm (i.e., very close to zero), in order to make the free spectral range of the device practically insensitive to temperature variations. The rest of the parts in the interferometer are made of fused silica, which has CTE of 0.5 ppm. The joints between the spacers, the fused silica and the beam splitter are implemented by optical contact technology. In essence, the parts are super-polished, contacted at room temperature, and then thermally treated for several hours in order to obtain a permanent bond. Mirror coatings are used in conventional manner to form the mirrors 14,16 on the glass plates 22,26 to reflect the impinging beams at the distal end of each cavity.

Assuming that the anti-reflection (AR) coated surfaces 32,34 of the glass plates 20,24 at the proximal end of each cavity are equidistant from the beam-splitting surface 18, the lengths $L_1$ and $L_2$ of the cavities determine the optical path difference (OPD) between the two arms of the interferometer 10. As is well understood in the art, the difference in the optical lengths of the two arms (which under the conditions described is the same as the difference between $L_1$ and $L_2$) determines the free spectral range (FSR) of the device. The relationship between the FSR of the device and the cavity lengths is given by $$FSR = \frac{C}{2(L_1 - L_2)} = \frac{C}{2(L_2 - L_1)} \qquad (1)$$

where C is the speed of light. For example, an OPD of 3,000 μm will produce an FSR of 100-GHz.

For optical communication DPSK demodulator applications, the relative lengths of the cavities are also selected so as to provide a time delay ($\tau_{DLI}$) between the two beams R and T returning to the beam-splitting surface 18 that is close to the time interval ($\tau_0$) between two adjacent bits. (If $\tau_{DLI} < \tau_0$, the interferometer can be used as a PDPSK—partial DPSK— demodulator.) FIG. 2 shows the spectra of two outputs O1 and O2 of a DPSK demodulator with FSR=50 GHz.

Copending U.S. application Ser. No. 11/360,959 and No. 11/485,653 describe various embodiments of novel Michelson-type interferometers used as DPSK demodulators. These demodulators provide a significant improvement over the prior art, but the operation of each device is limited to a single free spectral range. The present invention provides a solution for expanding the use of any free-space delay line interferometer (DLI) to multiple free-spectral-range applications.

SUMMARY OF THE INVENTION

This invention is based on the idea of using a switchable mode selector to change the free spectral range of a free-space delay-line interferometer. The mode selector consists preferably of a rotatable device with at least one transparent plate with a predetermined index of refraction and a corresponding thickness selected to produce a desired change in the free spectral range of the delay-line interferometer. Through an actuator, the device may be rotated in and out of the free-space optical path of the interferometer's arm (the transmission or the reflection arm) selected to determine the FSR of the interferometer. Thus, if used as a DPSK demodulator, the device of the invention enables operation at multiple predetermined free spectral ranges, each corresponding to a different transparent plate in the mode selector or to none.

In the preferred embodiment, the demodulator of the invention includes a 50/50 beam-splitter cube combined with two cavities that define the device's delay and free spectral range. The mode selector consists of a plurality of different transparent slabs, each judiciously designed to provide the desired change in the FSR of the demodulator, attached to a rotatable shaft so that any one of the slabs or none may be inserted in the appropriate optical path to obtained the desired FSR mode of operation.

Two additional components are preferably used to achieve thermal stability. A temperature-tuned phase shifter is placed in the reflection or the transmission arm to tune the phase of the DLI. A micro-heater is incorporated into the tuner to vary its temperature as necessary to phase tune the DLI. An ambient temperature compensator, preferably a plate made of the same material as the phase shifter, is used in the other arm of the interferometer to compensate for the thermal drift in the phase tuner introduced by the environment.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention is described throughout with reference to a Michelson interferometer. However, it is equally applicable to any free-space delay line interferometer. Therefore, the invention is intended to be so construed and it should not be limited to any particular form of interferometer configuration.

Figure 1:
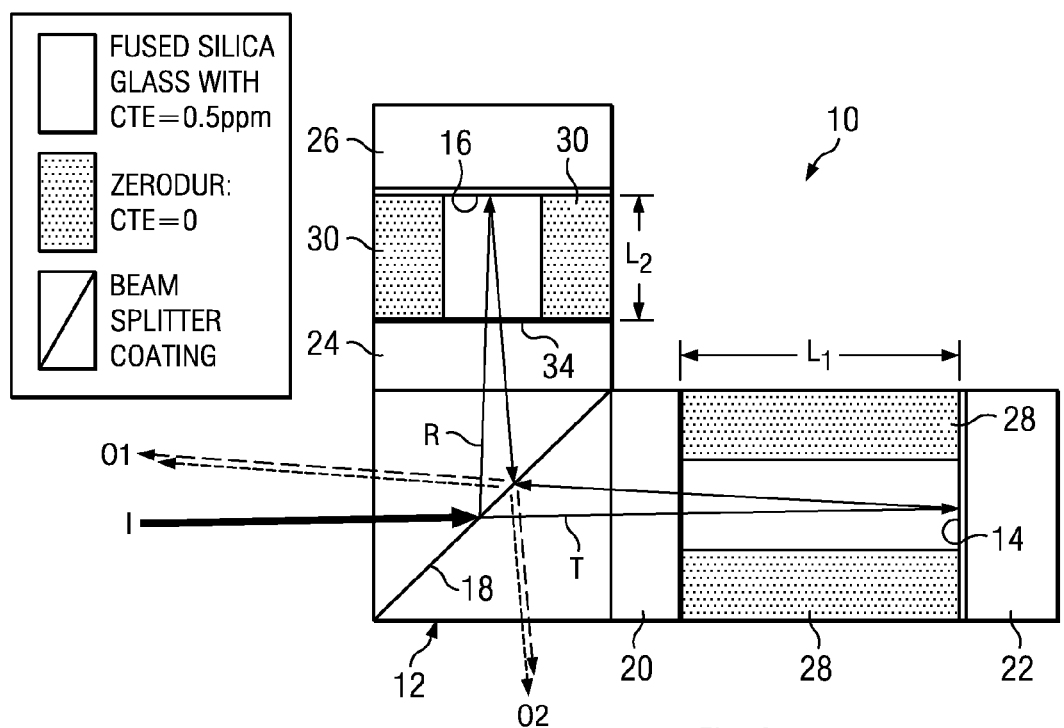
FIG. 1 illustrates schematically a conventional Michelson interferometer in free-space configuration.
Figure 2:
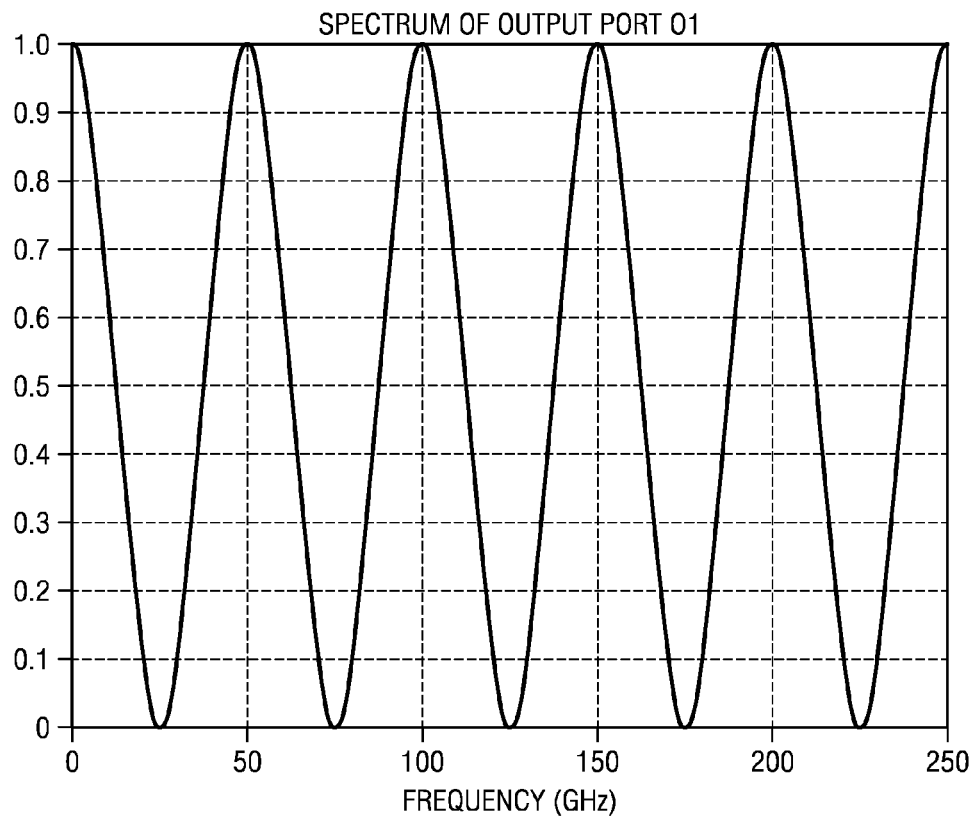
FIG. 2 illustrates the spectra of the two outputs, O1 (top) and O2 (bottom), of the interferometer of FIG. 1 with cavity lengths selected so as to produce an FSR of 50 GHz.
Figure 2:
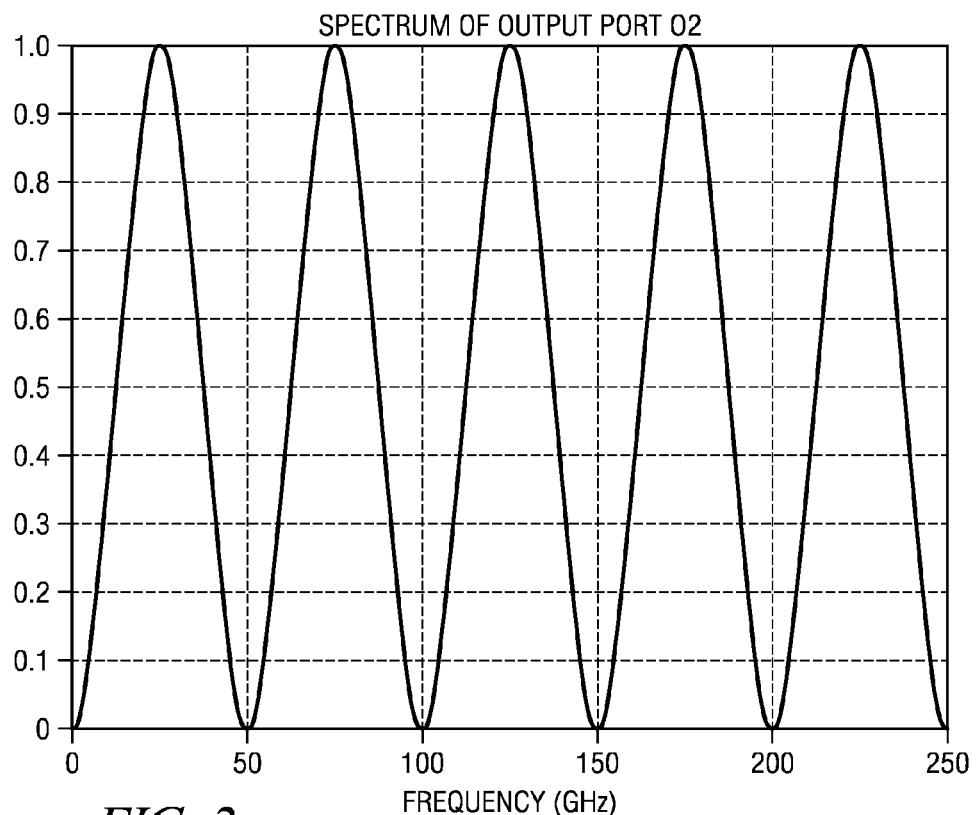
Figure 3A:
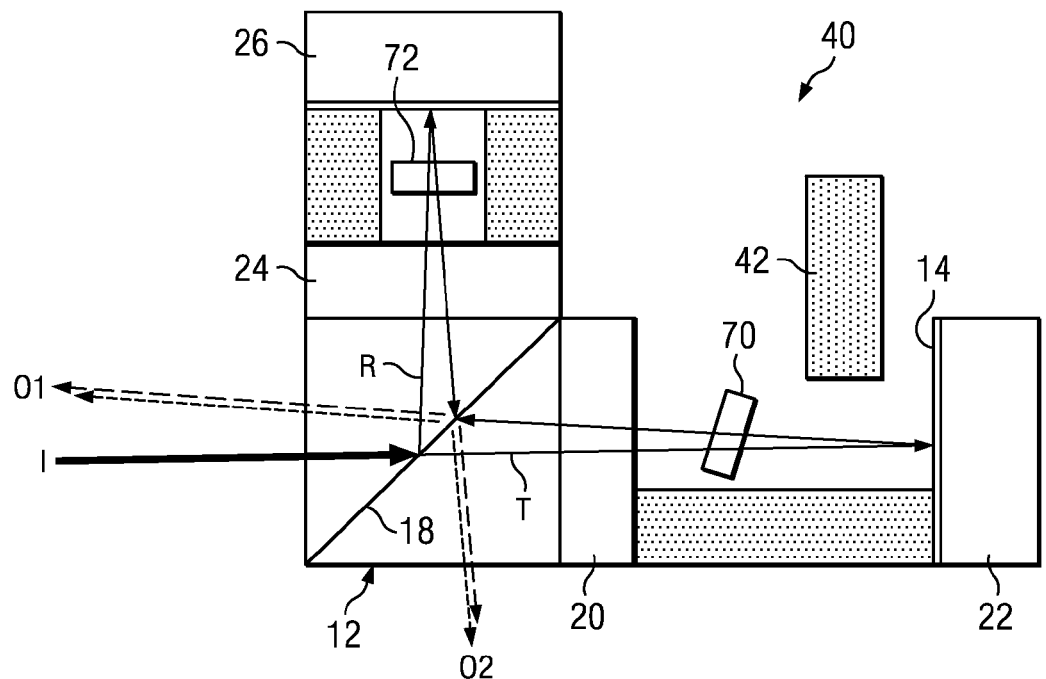
FIGS. 3A and 3B illustrate the two modes of operation of a dual-FSR DPSK demodulator according to the invention.
Figure 3B:
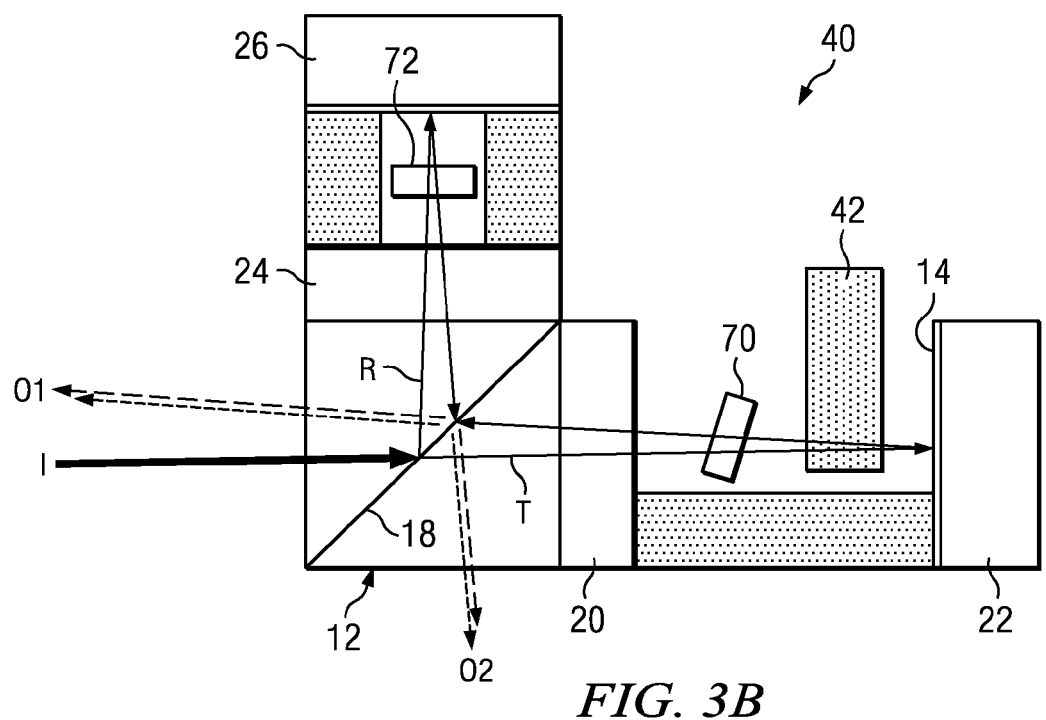

Referring to the figures, wherein like reference numerals and symbols are used throughout to refer to the same components, FIGS. 3A and 3B illustrate schematically a multiple free-spectral-range DPSK demodulator 40 according to the invention. The device, described in Michelson configuration for illustration, is the same as the Michelson interferometer of FIG. 1, but modified to allow the introduction of a transparent slab 42 in one of the cavities to change the OPD so as to obtain a predetermined alternative free spectral range for the demodulator. In the example, the cavity in the transmission arm of the interferometer is illustrated with an open end that permits the introduction of the slab 42 in the optical path of the transmission beam T. Because the transmission cavity is illustrated as longer than the reflection cavity, the addition of a transparent slab in the longer cavity ($L_1$) will increase the OPD and reduce the FSR of the demodulator. Alternatively, the addition of a transparent slab in the shorter cavity ($L_2$) would decrease the OPD and correspondingly increase the FSR.

In such dual-FSR DPSK demodulator, the transparent slab 42 can be positioned in (FIG. 3B) or out (FIG. 3A) of the optical path of the arm of the interferometer using a rotatable mode selector (not shown in the figure). As mentioned, with the slab 42 inside the path, the path length difference between the two interference beams is increased; therefore, the FSR is decreased. Thus, by switching the slab 42 in and out of the cavity, it is possible to switch the FSR of the DLI between two settings of interest. The motion of the mode selector can be controlled in conventional manner with a solenoid, a motor or other electro-mechanical device.

Figure 4:
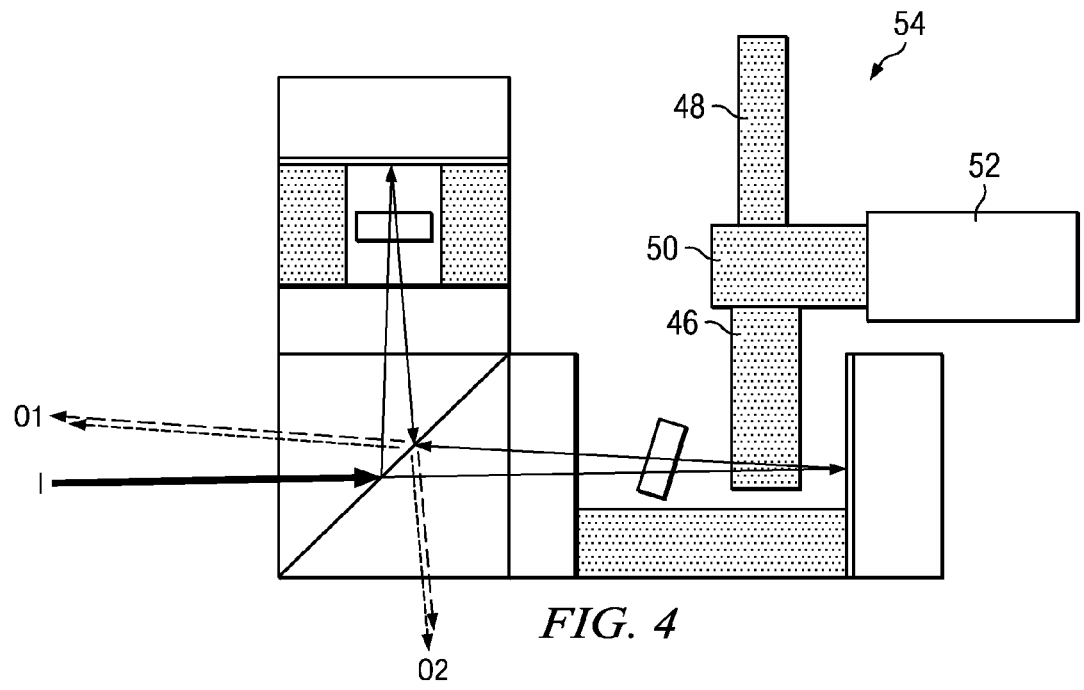
FIG. 4 illustrates a triple-FSR demodulator with a mode selector comprising two slab pieces with different thicknesses attached to a motor shaft.
Figure 5:
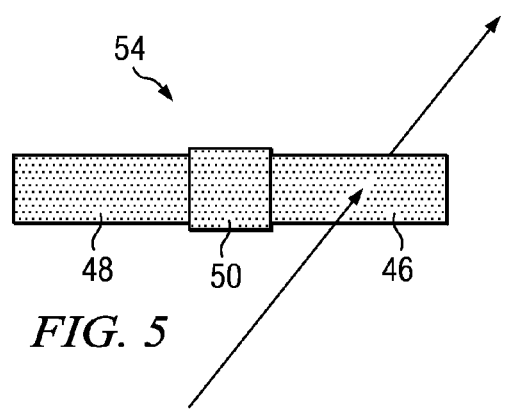
FIG. 5 is a front view of the mode selector of FIG. 4.

FIG. 4 illustrates a triple-FSR demodulator, where two slab pieces 46,48 with different thicknesses are attached to the shaft 50 of a motor 52 to obtain a three-way mode selector 54. The thickness of each slab piece 46,48 corresponds to a specific FSR for the DLI. Thus, simply by rotating the motor to place a particular slab in the optical path of the transmission arm cavity, the required FSR may be set. This design obviously affords three possible modes of operation, including one with no slab in the cavity. FIG. 5 illustrates the mode selector 54 in front view.

Figure 6:
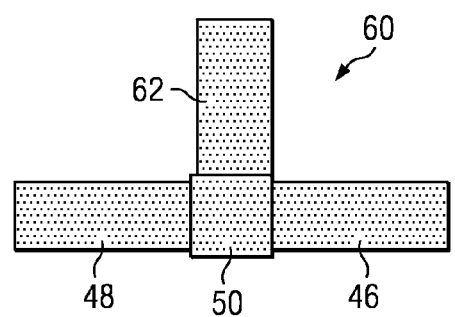
FIG. 6 illustrates a mode selector for a quadruple-FSR DPSK demodulator.

FIG. 6 illustrates a mode selector 60 for a quadruple-FSR demodulator. Three slabs 46,48,62 with three different thicknesses permit operation at three corresponding FSRs by successive 90-degree rotations of the mode selector. In addition, a fourth mode of operation is provided when no slab is present in the cavity.

Thus, by judiciously selecting the material of the slabs in the mode selector of the invention (i.e., with the appropriate optical and thermal properties), a multiple-FSR DLI may be implemented. For example, if a transparent slab (46, 48 or 62) consists of an athermal optical parallel plate with thickness $d_S$, the change in the delay produced by the slab will be equal to $(n_S-1)d_S$, where $n_S$ is the refractive index of the material.

Figure 7:
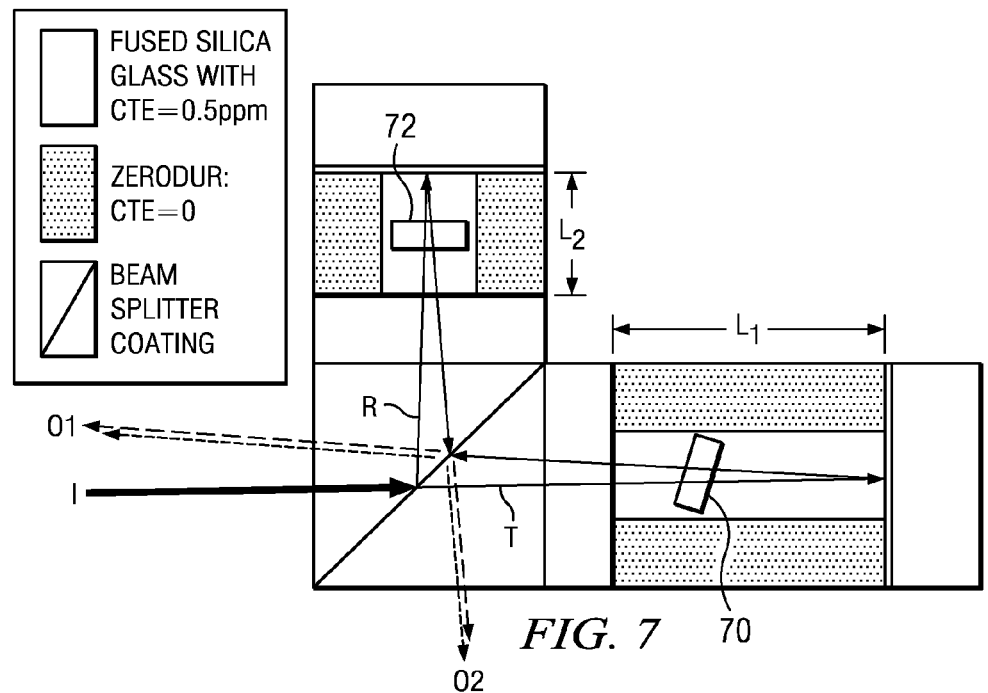
FIG. 7 illustrates a demodulator with a temperature-tuned phase shifter and a corresponding ambient temperature compensator.

However, even with athermal mode selector slabs, it is advisable to provide tunability to the free-space DPSK demodulator (i.e., enable tuning by shifting the central wavelength of the device to track the grid of the signal received from the network). This may be accomplished by introducing a temperature-tuned phase shifter 70 in either arm of the demodulator and a corresponding ambient temperature compensator 72 in the other arm. FIG. 7, for simplicity, illustrates such devices in the two arms of the conventional free-space DPSK demodulator of FIG. 1. The transmission arm of the DLI and its cavity are again used for illustration of the placement of the phase shifter, but it is understood that the reflection arm could be used in the same way. A micro-heater is incorporated into the phase shifter 70 to vary its temperature as necessary to tune the DLI. The ambient temperature compensator 72, preferably a plate made of the same material as the phase shifter 70, is used to compensate for the thermal drift in the phase shifter introduced by the environment.

Figure 8:
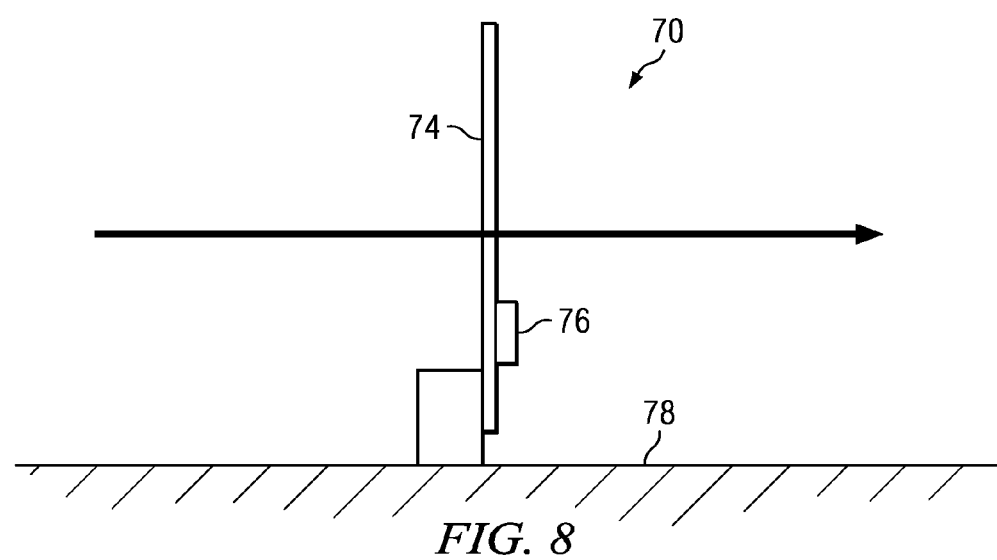
FIG. 8 shows schematically the structure of a temperature-tuned phase shifter.

FIG. 8 shows the typical structure of a temperature-tuned phase shifter 70. It consists of a thermally sensitivity optical plate 74 that is placed in the optical path of the beam of interest. A micro-heater 76 is used to control the temperature of the plate, thereby affecting the optical path length therethrough. The phase shifter is commonly attached to the housing 78 of the device, which also provides a heat sink that facilitates control of temperature fluctuations. The heater 76 may be coupled to either one or both the phase shifter 70 and the compensator 72 (in the latter case to increase the tuning range).

The thickness of the compensator and the phase tuner are determined in conventional manner. If the transparent slabs of the FSR mode selector are made of an athermal material, the thickness of the compensator 72 should be the same as that of the phase shifter 70 to compensate for its intrinsic thermal drift (i.e., the amount of delay drift due to changes in ambient temperature). If the mode selector slabs are not athermal, then the thickness of the compensator 72 should be different from that of the phase tuner, and it should be selected as required to also compensate for the intrinsic thermal drift of each slab. Obviously, a compensator 72 can only compensate for one mode selector slab. Therefore, for each additional slab in the mode selector, a corresponding additional compensator with the appropriate thickness is required. This can be implemented by having a set of compensators mounted on a compensator selector (similar to the FSR mode selector) for alternatively introducing the appropriate compensator in the second arm of the interferometer when a given FSR slab is changed (or removed) in the first arm.

If this latter approach to thermal compensation is adopted, for each slab of the FSR mode selector, the thickness of the corresponding compensator would be selected so as to satisfy the relation $$\text{Delay} = (n_P-1)d_P + (n_S-1)d_S - (n_C-1)d_C, \quad (2)$$

where Delay is the delay required to produce the desired FSR; and $n_P$, $n_S$ and $n_C$ are the refractive indices and $d_P$, $d_S$ and $d_C$ are the thicknesses of the phase-shifter, FSR slab and compensator, respectively. The same result can also be obtained by appropriately selecting different materials for the phase shifter and the compensator. As one skilled in the art would readily recognize, in such case the values of $d_S$ and $d_C$ would be selected according to their optical thermal coefficients (g and h, respectively) such that $(d_S)(g)=(d_C)(h)$, which would render their combination athermal. Therefore, by choosing two materials with the right combinations of thickness and optical thermal coefficients, the delay-line interferometer can have the required time delay and also be athermal. Finally, it should be noted that it would also be possible to use a single compensator 72 for all FSR modes of operation if a microheater were coupled to the compensator 72 as well as to the phase shifter 70.

Thus, a simple device and mode of operation have been disclosed that enable the use of a free-space DPSK demodulator at alternative free spectral ranges. By providing a mode selector in an arm of the demodulator with multiple transparent plates designed to produce outputs with different predetermined FSRs, the same demodulator can be used for alternative modes of operation simply by removing or changing the plate in the optical path. Thermal compensation is preferably also provided with a temperature-tuned phase shifter in one arm of the DLI and a corresponding ambient temperature compensator in the other arm.

While the invention has been shown and described in what are believed to be the most practical and preferred embodiments, it is recognized that departures can be made therefrom within the scope of the invention. For example, as mentioned, a multiple-FSR DPSK demodulator according to the invention could be implemented with any free-space interferometer configuration, such as illustrated in in copending U.S. application Ser. Nos. 12/498,419, 12/509,474 and 12/534,124. Similarly, a combination of transparent plates could be used with two mode selectors, one for each arm of the interferometer. Therefore, the invention is not to be limited to the details disclosed herein, but is to be accorded the full scope of the claims so as to embrace any and all equivalent apparatus and methods.

What is claimed is:

1. A multiple-free spectral range (FSR) delay-line interferometric demodulator comprising:
    a free-space delay-line interferometer structure that includes a beam-splitter surface for splitting an input beam into a transmission beam and a reflection beam;
    a reflective surface in an optical path of each of said transmission and reflection beams;
    a switchable FSR mode selector including at least one transparent slab; and
an actuator to selectively position one of said at least one transparent slab in an optical path of at least one of said transmission and reflection beams.

2. The demodulator of claim 1, further comprising a temperature-tuned phase shifter in an optical path of one of said transmission and reflection beams.

3. The demodulator of claim 2, further comprising a temperature compensator in an optical path of the other of said transmission and reflection beams.

4. The demodulator of claim 1, wherein said interferometer structure includes a beam-splitter cube and two cavities in optical contact therewith.

5. The demodulator of claim 1, wherein said interferometer structure includes a beam-splitter cube and two cavities in optical contact therewith; and the demodulator further comprises a temperature-tuned phase shifter in an optical path of one of said transmission and reflection beams, and a temperature compensator in an optical path of the other of said transmission and reflection beams.

* * * * *